(12) United States Patent
Benveniste et al.

(10) Patent No.: US 11,663,365 B2
(45) Date of Patent: May 30, 2023

(54) ONE-WAY FUNCTION

(71) Applicants: STMicroelectronics (Rousset) SAS, Rousset (FR); STMicroelectronics (ALPS) SAS, Grenoble (FR)

(72) Inventors: Marc Benveniste, Aix-en-Provence (FR); Fabien Journet, Grenoble (FR); Fabrice Marinet, Chateauneuf le Rouge (FR)

(73) Assignees: STMICROELECTRONICS (ROUSSET) SAS, Rousset (FR); STMICROELECTRONICS (ALPS) SAS, Grenoble (FR)

( * ) Notice: Subject to any disclaimer, the term of this patent is extended or adjusted under 35 U.S.C. 154(b) by 299 days.

(21) Appl. No.: 16/928,901

(22) Filed: Jul. 14, 2020

(65) Prior Publication Data
US 2021/0019448 A1 Jan. 21, 2021

(30) Foreign Application Priority Data

Jul. 15, 2019 (FR) ...................................... 1907911

(51) Int. Cl.
| | |
|---|---|
| *G06F 21/44* | (2013.01) |
| *G06F 21/72* | (2013.01) |
| *G06F 21/75* | (2013.01) |
| *G06F 1/08* | (2006.01) |
| *G06F 3/12* | (2006.01) |
| *H04L 9/32* | (2006.01) |

(52) U.S. Cl.
CPC ............... *G06F 21/75* (2013.01); *G06F 1/08* (2013.01); *G06F 3/1238* (2013.01); *G06F 21/44* (2013.01); *G06F 21/72* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 4,826,332 | A | 5/1989 | Ukai et al. |
| 5,920,591 | A | 7/1999 | Fukasawa et al. |
| 9,794,249 | B1 | 10/2017 | Truskovsky et al. |
| 2003/0233548 | A1 | 12/2003 | Moreaux et al. |
| 2004/0168071 | A1 | 8/2004 | Silverbrook |

(Continued)

FOREIGN PATENT DOCUMENTS

| | | |
|---|---|---|
| EP | 1 430 391 B1 | 6/2005 |
| EP | 1 840 731 A2 | 10/2007 |

(Continued)

*Primary Examiner* — Nelson S. Giddins
(74) *Attorney, Agent, or Firm* — Seed Intellectual Property Law Group LLP

(57) ABSTRACT

Authenticating a device using processing circuitry that generates fingerprints based on states of a plurality of nodes that are coupled to a plurality of circuits. A first fingerprint is generated at a first time based on first states of the plurality of nodes. A second fingerprint is generated at a second time based on second states of the plurality of nodes, the first fingerprint influencing the second states. Electronic data is obtained from the device to be authenticated. The electronic data is compared with a fingerprint generated and a determination whether to authorize operation of the device is made based on a result of the comparison.

26 Claims, 6 Drawing Sheets

(56) References Cited

U.S. PATENT DOCUMENTS

| | | | |
|---|---|---|---|
| 2005/0038755 A1* | 2/2005 | Silverbook | G06K 7/14 |
| | | | 348/E5.055 |
| 2005/0050325 A1 | 3/2005 | Ohkubo | |
| 2005/0099872 A1 | 5/2005 | Morgan | |
| 2006/0253811 A1 | 11/2006 | Guo et al. | |
| 2007/0011023 A1 | 1/2007 | Silverbrook | |
| 2007/0143623 A1 | 6/2007 | Walmsley et al. | |
| 2009/0213427 A1* | 8/2009 | Walmsley | G06F 21/606 |
| | | | 358/1.15 |
| 2010/0253966 A1 | 10/2010 | Walmsley et al. | |
| 2011/0161903 A1 | 6/2011 | Iwashita | |
| 2012/0069992 A1 | 3/2012 | Jozwiak et al. | |
| 2013/0073873 A1 | 3/2013 | Morioka | |
| 2013/0293918 A1* | 11/2013 | Kitamura | G07G 1/0018 |
| | | | 358/1.14 |
| 2015/0081579 A1 | 3/2015 | Brown et al. | |
| 2015/0263852 A1 | 9/2015 | Alon | |
| 2015/0356733 A1 | 12/2015 | Soldea et al. | |
| 2016/0036805 A1 | 2/2016 | Lin | |
| 2016/0164672 A1 | 6/2016 | Karighattam et al. | |
| 2017/0003620 A1 | 1/2017 | Ignatchenko et al. | |
| 2017/0004168 A1 | 1/2017 | Hakala et al. | |
| 2017/0161719 A1 | 6/2017 | Bhatia | |
| 2017/0261545 A1 | 9/2017 | Federley et al. | |
| 2018/0124048 A1 | 5/2018 | Yoo | |
| 2019/0098015 A1 | 3/2019 | Hookham-Miller | |
| 2019/0220587 A1 | 7/2019 | Marinet | |
| 2019/0222421 A1* | 7/2019 | Daemen | H04L 9/3236 |
| 2019/0303987 A1 | 10/2019 | Ignatius | |

FOREIGN PATENT DOCUMENTS

| | | |
|---|---|---|
| EP | 2 605 175 A2 | 6/2013 |
| WO | 2015/030818 A1 | 3/2015 |

\* cited by examiner

ONE-WAY FUNCTION

BACKGROUND

Technical Field

The present disclosure generally concerns electronic circuits and systems, and more particularly electronic devices capable of verifying the authenticity of a product associated with a consumable or peripheral.

Description of the Related Art

The presence of non-authentic consumables of a product is a problem for the product manufacturer and for authorized suppliers of authentic consumables, particularly in case of returns due to functional problems. It is beneficial to be able to distinguish authentic products from non-authentic products.

Authentication methods have the function of verifying that the consumable paired with the product is effectively authentic or authorized. Such authentication methods may be used to verify the authenticity of devices in some contexts.

It could be beneficial to at least partly improve certain aspects of product authentication methods and, more particularly, certain aspects of methods of implementing a function used in authentication methods.

BRIEF SUMMARY

It may be desirable to provide higher-performance and more secure product authentication methods.

An embodiment may facilitate overcoming all or part of the disadvantages of known product authentication methods.

An embodiment provides a method of implementation of a first one-way function, which may be part of a family of one-way functions, by a device: wherein a second function takes into account states of digital nodes distributed in circuits of the device implementing third functions; said states of the nodes depend on a previous result of the first function; and wherein the second function and/or the third functions are one-way functions.

According to an embodiment, said first function is selected among the family of one-way functions by using a parameter supplied by an activation function in order to configure the third functions.

According to an embodiment, said first function is selected among the family of one-way functions by using said previous result in order to configure the third functions.

According to an embodiment, the second function is a signature function.

According to an embodiment, the second function is a hash function.

According to an embodiment, said previous result of the first function has an influence upon the result of the third functions.

According to an embodiment, said result is further used to modify clock signals of the device.

According to an embodiment, said result is further used to modify clock signals having an influence upon the implementation of the third functions.

Another embodiment provides a method of authentication of a first electronic device by a second electronic device, using the previously-described method.

Another embodiment provides a cipher method using the previously-described method.

Another embodiment provides a hash method using the previously-described method.

Another embodiment provides an electronic device comprising a circuit capable of implementing the previously-described method.

According to an embodiment, the device is a consumable or peripheral device.

According to an embodiment, the device is capable of implementing the previously-described authentication method.

According to an embodiment, the device is capable of implementing the previously-described cipher method.

According to an embodiment, the device is capable of implementing the previously-described hash method.

A method according to the present disclosure may be summarized as comprising generating, using a first circuit of a device at a first time, a first fingerprint based on first states of a plurality of second circuits of the device; generating, using the first circuit at a second time, a second fingerprint based on second states of the plurality of second circuits, the second states of the second circuits being based on an output of the first circuit; performing a comparison between the second fingerprint and electronic data received from an external device; and determining whether to authorize operation of the device with the external device based on a result of the comparison.

According to an embodiment, the method comprises providing the first fingerprint to the plurality of second circuits that determine the first states, one or more of the plurality of second circuits performing operations based on the first fingerprint to determine the second states. According to an embodiment, the second fingerprint is generated using a hash function, the method comprising generating the second states of the plurality of second circuits based on the second fingerprint. According to an embodiment, the plurality of second circuits generate the second states using a signature function. According to an embodiment, the first circuit performs a one-way function to generate the first fingerprint. According to an embodiment, the method comprises modifying clock signals of the device based on the first fingerprint. According to an embodiment, operations performed by the plurality of second circuits are based on the clock signals modified. According to an embodiment, the method comprises providing the first fingerprint to a third circuit that controls which of the plurality of second circuits performs a cryptographic operation for a given cycle.

A system according to the present disclosure may be summarized as comprising a first device; and a second device coupled to the first device. The second device includes a plurality of logic circuits having outputs coupled to a plurality of nodes of the second device; and processing circuitry coupled to the plurality of nodes and coupled to inputs of the plurality of logic circuits. The processing circuitry is configured to generate a plurality of digital fingerprints over a time period, each digital fingerprint generated based on current states of the plurality of nodes, subsequent states of the plurality of nodes being generated based on each digital fingerprint; receive electronic data from the first device; compare the electronic data with a digital fingerprint of the plurality of fingerprints generated by the processing circuitry; and determine whether to authorize operation of the second device with the first device based on whether the electronic data matches the digital fingerprint.

According to one embodiment, the second device is an electronic device and the first device is a consumable. According to an embodiment, the second device is a printer and the first device is an ink cartridge. According to an embodiment, the processing circuitry generates a first digital fingerprint based on first states of the plurality of nodes and generates a second digital fingerprint based on second states of the plurality of nodes, the plurality of logic circuits generating the second states based on the first digital fingerprint. According to an embodiment, the processing circuitry includes one-way circuitry having an input coupled to the plurality of nodes and an output coupled to the plurality of logic circuits, the one-way circuitry configured to perform a cryptographic hash function using states of the plurality of nodes as input.

A device according to the present disclosure may be summarized as comprising a plurality of logic circuits having outputs coupled to a plurality of nodes; processing circuitry coupled to the plurality of nodes and coupled to inputs of the plurality of logic circuits; a connector configured to electronically connect the processing circuitry with circuitry of an external device, the processing circuitry configured to generate a plurality of digital fingerprints over a time period, each digital fingerprint generated based on current states of the plurality of nodes, subsequent states of the plurality of nodes being generated based on each digital fingerprint; receive electronic data from circuitry of the external device; compare the electronic data with a digital fingerprint of the plurality of fingerprints generated by the processing circuitry; and authorize operation of the device with the external device based on a match between the electronic data and the digital fingerprint.

According to one embodiment, the devices a printer. According to an embodiment, the processing circuitry is configured to send a signal to the external device requesting the electronic data. According to one embodiment, processing circuitry includes one-way circuitry having an input coupled to the plurality of nodes and an output coupled to the plurality of logic circuits, the one-way circuitry configured to perform a cryptographic hash function using states of the plurality of nodes as input. According to one embodiment, the processing circuitry includes cycle circuitry defining a number of cycles for generating the plurality of digital fingerprints. According to an embodiment, the processing circuitry generates the second fingerprint using a hash function, and the plurality of logic circuits generate the second states based on the second fingerprint. According to an embodiment, the plurality of logic circuits generates the second states using a signature function. According to an embodiment, the processing circuitry includes cycle circuitry that modifies clock signals of the device based on the first fingerprint. According to an embodiment, the plurality of logic circuits perform operations based on the clock signals modified. According to an embodiment, the processing circuitry includes cycle circuitry that selects which of the plurality of second circuits performs a cryptographic operation for a given cycle.

A device according to the present disclosure may be summarized as comprising a plurality of logic circuits having outputs coupled to a plurality of nodes; processing circuitry coupled to the plurality of nodes and coupled to inputs of the plurality of logic circuits; and a connector configured to electronically connect the processing circuitry with circuitry of an electronic device. The processing circuitry is configured to receive, from the electronic device via the connector, a request to provide electronic data for verifying authenticity of the device; generate a plurality of digital fingerprints over a time period, each digital fingerprint generated based on current states of the plurality of nodes and each digital fingerprint influencing subsequent states of the plurality of nodes provided by the plurality of logic circuits; and transmit a digital fingerprint to the electronic device to fulfill the request.

According to an embodiment, the device is an ink cartridge and the electronic device is a printer device. According to an embodiment, the processing circuitry includes one-way circuitry having an input coupled to the plurality of nodes and an output coupled to the plurality of logic circuits, the one-way circuitry configured to perform a cryptographic hash function using states of the plurality of nodes as input.

The foregoing and other features and advantages will be discussed in detail in the following non-limiting description of specific embodiments in connection with the accompanying drawings.

DETAILED DESCRIPTION

Figure 1:
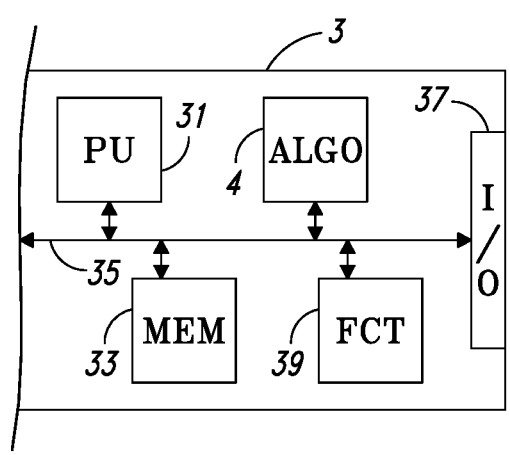
FIG. 1 is a schematic diagram of an embodiment of an electronic circuit of the type equipping a consumable and a product.

The same elements have been designated with the same reference numerals in the different drawings except where otherwise indicated by context. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, for example plus or minus 5%, of the value in question.

In the following description, the term consumable will designate an electronic device capable of being coupled to an electronic product to operate. Consumables can generally be interchanged once their use is over. As an example, a memory device (e.g., non-volatile memory card) is a consumable for a digital camera. This is also true for an ink cartridge for a printer, for an interchangeable battery for a cell phone, a liquid cartridge for an electronic cigarette, a video game cartridge for a videogame system. The embodiments described in relation with FIGS. 1 to 5 are non-limiting examples of a consumable-product pair, which may be applicable to numerous other consumable-product pairs.

FIG. 1 shows a schematic diagram in the form of blocks an embodiment of an electronic circuit or device 3 of the type of those equipping a device and a consumable.

Circuit 3 comprises:

a processing unit or circuit 31 (PU), which may be a state machine, a microprocessor, or a programmable logic circuit, by way of non-limiting example;

one or a plurality of volatile and/or non-volatile data storage areas 33 (MEM) for storing all or part of data and/or programs appropriate to perform the operations disclosed herein;

one or a plurality of data, address, and/or control buses 35 between the different elements internal to circuit 3;

an input-output interface 37 (I/O) of communication with the outside of circuit 3; and various other circuits according to the application, symbolized in FIG. 1 by a block 39 (FCT).

According to the shown embodiment, circuit 3 further comprises an authentication circuit 4 (ALGO) implementing an authentication method. For this purpose, block 4 is a device having hardware specifically configured to execute encryption operations (e.g., via wired logic, application specific integrated circuitry, system-on-a-chip) to, for example, implement an authentication method.

An authentication mechanism based on a digital fingerprint, digital signature, or other such digital codes which have the particularity of being linked to the topography of the integrated circuit or of the circuit portion taking part in the authentication and executing cryptographic operations is provided in an embodiment. Although reference will be made hereafter to the authentication circuit, what is described may concern a portion only of the circuit. Topography here means the layout of the components forming circuit 3 on an electronic chip or on a substrate.

It is also provided to equip products and consumables with identical authentication circuits, that is, circuits having identical topographies, so that a processing executed on one of the circuits results, when it is executed on the other circuit, in an identical behavior thereof. "Behavior" means that the electronic behavior of the circuit is identical on execution of a calculation, of a program, or of identical operations.

Figure 2:
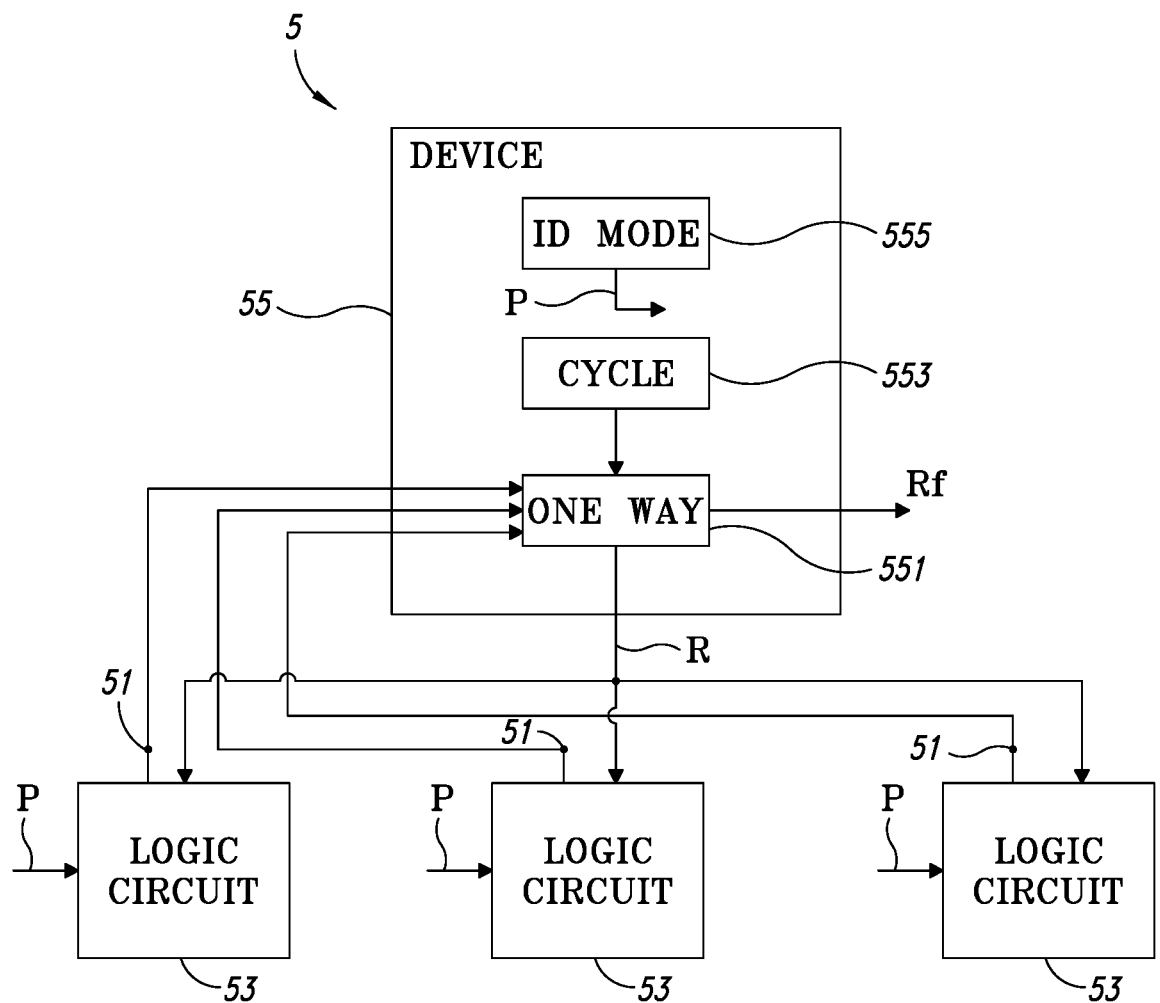
FIG. 2 is a schematic diagram of an embodiment of a circuit belonging to an authentication circuit.

FIG. 2 shows a schematic diagram in the form of blocks an embodiment of a circuit 5 implementing a function used by authentication circuit 4, which is part of circuit 3 of FIG. 1. In other words, circuit 5 forms part of the authentication circuit 4.

Circuit 5 is capable of implementing a one-way function capable of being used in an authentication method.

Figure 3:
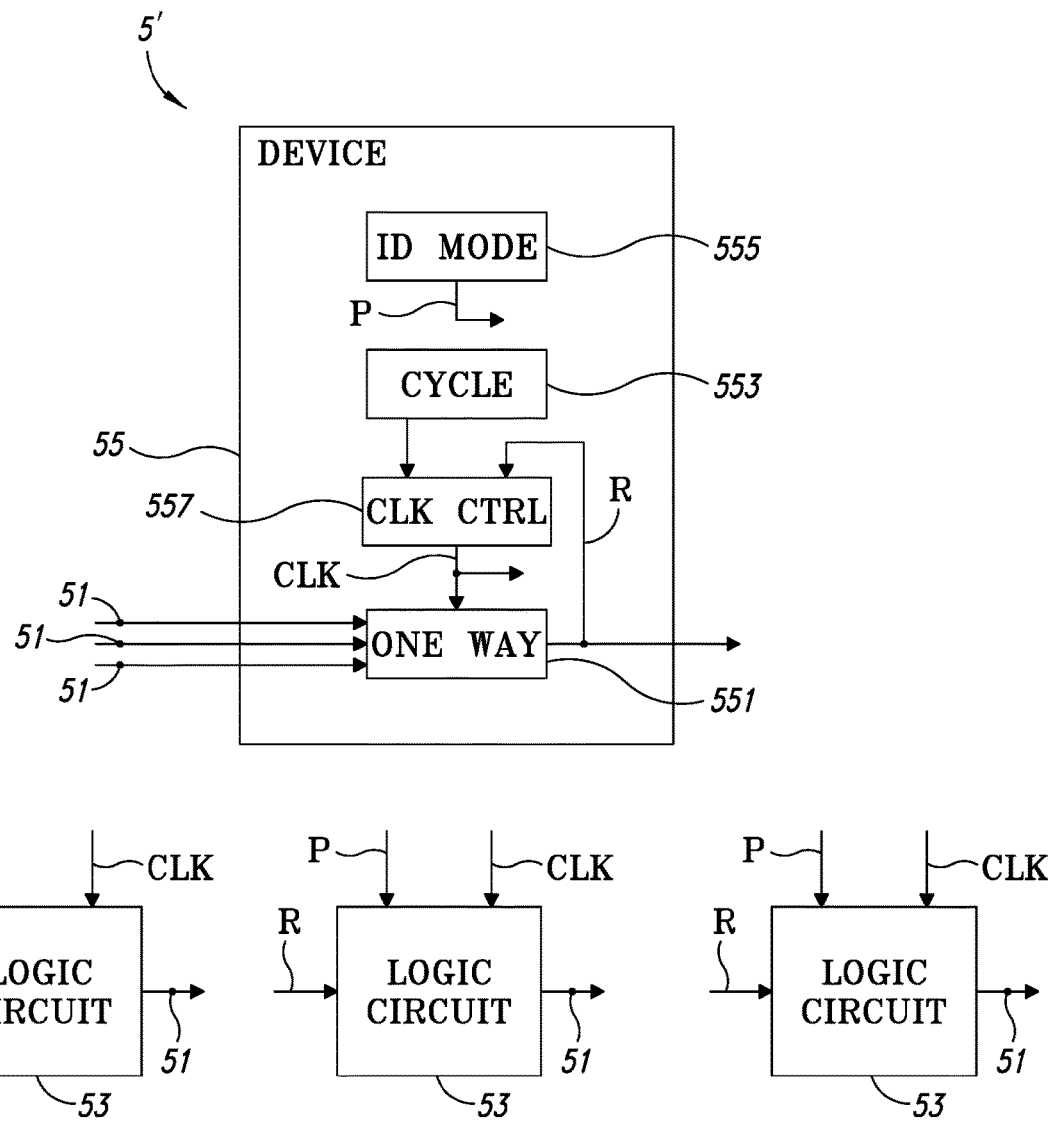
FIG. 3 is a schematic diagram of an embodiment of a circuit belonging to an authentication circuit.

Circuit 5 comprises different logic circuits 53 implementing complex functions, which may include logic operations and/or cryptographic operations. Circuit 5 may comprise two or more logic circuits 53 (three circuits 53 are shown in FIG. 3). The more logic circuits 53 circuit 5 comprises, the more complex the function implemented by circuit 5. The logic circuits 53 each perform a set of operations that vary based on an input received by the logic circuits 53.

Digital nodes 51 of the circuit 5 are input and output nodes of logic circuits 53. The digital nodes 51 may convey a collection of one or more bits each having a high state, "1", or a low state, "0." Each of the nodes 51 may also be nodes internal to a logic circuit 53 such that an output of a logic circuit 53 is also connected internally to be used as an input to the same logic circuit 53 in a next iteration. The distribution of digital nodes 51 depends on the topography of circuit 5. The number of nodes 51 sampled by circuit 5 and having their electric states taken into account for the signature conditions the robustness of a unique identifier calculated. For example, circuits 53 may each include a plurality of internal nodes (e.g., 64 nodes, 128 nodes) to obtain a complex function.

Circuits 53 may be further used by circuit 4 for other operations, for example, cipher operations, hash operations, etc. The distribution of the nodes 51 of the circuits 53 taken into account in the set of operations performed by the circuits 53 depends on the application of the hash function of circuit 5. The more the nodes are distributed across a large surface area of circuit 3, the more complex the one-way function implemented by circuit 5.

Circuit 5 further comprises a main device 55 including processing circuitry. The processing circuitry is hardware that includes:

a one-way component or circuit 551 configured to perform a one-way function, such as a non-linear hash function that generates a unique value of a fixed size for a given input;

a cycle component or circuit 553 configured to manage a count of cycles or iterations; and an ID mode component or circuit 555 configured to activate an authentication method.

The one-way component 551, the cycle component 553, and the ID mode component 555 may be implemented as hardware, software or a combination thereof.

The encryption operation (or operations) performed by the one-way component 551 is a function capable of delivering a result called code R based on states of nodes 51. The result R is a digital fingerprint generated by applying a one-way function, such as a cryptographic hash function, to code(s) or electronic data received from the circuits 53. More generally, block 551 may be adapted to execute a family of functions adapted to supply result R, in order to choose which function of the family of functions is executed, blocks 53 may receive a parameter P from block 555. In other words, parameter P is able to configure the cryptographic function executed by each block 53. This one-way function, selected and executed by block 551, may be used over a plurality of iterations, having their number managed by the function of cycle component 553. The cycle component 553 may control the one-way component 551 to perform a number of iterations or cycles to be performed.

According to an embodiment, at each new iteration, code R or portions of code R calculated at the previous iteration are injected into circuits 53 to modify their internal states and thus their operation. The state of each of the circuits 53, and as a result the operations performed by the circuits 53, may be modified based on all or part on the code R provided. For example, each of the circuits 53 may implement various permutations of operations or differentiated operations performed based on all or part of the code R provided. The injection of code R or of portions of code R into the circuits 53 may add arguments to the operations implemented by circuits 53, which thus modifies the operation of said circuits 53. The various permutations or differentiations implemented by the circuits 53 include variations in the order of operations, shift digits, vary the type of operations, and which parts of the code R are operated on, by way of non-limiting example. The cycle component 553 may be coupled to the circuits 53 and configured to control when and which of the circuits 53 perform operations for a given cycle.

The permutations in operations implemented by the circuits 53 may depend, at least in part, on the code R. The circuits 53 may, based on the code R, select whether an internal signal (e.g., states of the nodes 51), an external signal (e.g., code R, clock signal, data signal provided by cycle component 553), or both are used as an input for a set of operations to be performed in a cycle. In some implementations, the code R may be divided such that a first portion of the code R is provided as a first input to an individual logic circuit 53 and a second portion of the code R is provided as a second input to the individual logic circuit 53. The cycle component 553 may also select, based on the code R, (e.g., via an enable line, via a select line) one or more of the logic circuits 53 will perform a complex function for a given cycle. Therefore, over several cycles, the state of one individual logic circuit 53 may be different than the state of a different individual logic circuit 53 even though both received the same series of codes R.

The states of the nodes 51 (e.g., binary coded values) are thereby modified. This complicates the calculation of code R. Once the iterations are over, the operation of circuit 5 delivers a final code Rf. The device 55 may include additional logic circuitry that combines the output from the circuits 53 (e.g., an array of OR gates, an array of exclusive OR gates, an array of AND gates).

When the operation of circuit 5 is used for an authentication method, the final code Rf is generated by two identical authentication circuits of the one-way component 551. Thus, any signature calculation is appropriate, for example, a hash value produced using a hash function, or even a direct comparison of a word representing all the sampled states. However, providing a cryptographic processing or combination or a one-way function to calculate a signature increases the robustness of the authentication. More particularly, the operation of one-way component 551 for example is a one-way function—for example, a hash function. If the function of one-way component 551 is not a one-way function, then at least one operation performed by the circuits 53 is a one-way function. The circuits 53, in at least some embodiments, are included in the authentication circuit 4.

The ID mode component 555 activates an authentication method that enables initiation of a method of activation of circuit 3 of FIG. 1.

In this example, a method of authenticating the circuit comprises generating a signature, or a code, with the function implemented by circuit 5. During an initial phase, or first iteration, circuits 53 are initialized by processor 31, or are left in their initial state. Thus, the states of nodes 51 are in an initial state, and a first code R is loaded by the function of one-way component 551 from these states. During the next iterations, the code R of the previous iteration is used to modify the functions implemented by circuits 53. Thus, at each iteration, the states of nodes 51 are modified, and a new code R is generated from these states and from the code R of the previous iteration.

FIG. 3 very schematically shows in the form of blocks another embodiment of an authentication circuit 5'.

The circuit 5' of FIG. 5 comprises elements common with the circuit 5 of FIG. 3. These elements will not be described again hereafter.

Circuit 5' further comprises a block or circuit 557 (CLK CTRL) representing a function of management of different clock signals used by circuits 53 and by functions of block 551 of FIG. 2. Block 557 may supply one or more clock signals CLK to circuits 53 and 551.

Block 557 may receive information from one-way component 551, for example, code R or portions of code R. This information may for example enable to modify the clock signals, for example, by triggering or not a new cycle, or by modifying the frequencies of the clock signals. More particularly, code R may be used to slow down or accelerate the executions of the functions implemented by circuits 53, and thus modify the code R of the next iteration by modifying the states of nodes 51.

An advantage of this embodiment is that the use of code R to modify the clock signals enables to further complicate the obtaining of the final code Rf.

Figure 4:
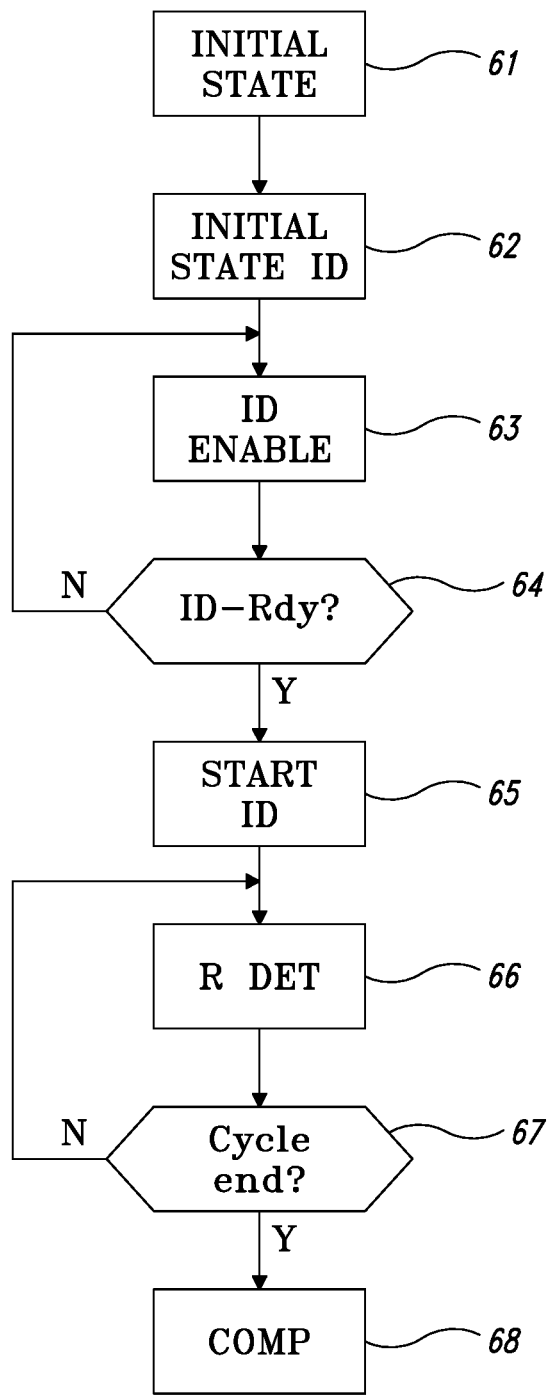
FIG. 4 shows a flowchart illustrating an embodiment of an authentication method.

FIG. 4 is a flowchart illustrating an embodiment of an example of an authentication method using one of the circuits 5 and 5' described in relation with FIG. 2 or 3. As an example, this authentication method may be implemented by a product and a consumable.

At a step 61 (INITIAL STATE), circuit 5 is placed in wired or wireless contact with another circuit identical thereto, or which comprise identical authentication circuit portions. The authentication method is then started by the functions of activation of the authentication method (ID mode component 555) of each circuit 3, for example, by an exchange of first data. A first step is the initialization of the logic circuits of circuits 53.

At a step 62 (INITIAL STATE ID), the functions forming the device 55 are initialized. As an example, selection parameter P of circuit 551 may be generated.

At a step 63 (ID ENABLE) a control signal requests the activation of the mode of authentication of circuit 3.

At a step 64 (ID RDY), it is verified whether the authentication mode is ready to be used. If the activation of this mode is not possible (output N of block 64), then the next step is step 63 again, otherwise (output Y of block 64), the next step is step 65.

At step 65 (START ID), the authentication method starts.

At a step 66 (R DET), the first code R is generated by the signature function of one-way component 551, based on the states of digital nodes 51. The iterations then start and the code is modified throughout them, to finally provide the final code Rf. Each iteration includes generation of the first code R by the one-way component 551 and performance of one or more logical operations by the circuits 53 to provide an output on the nodes 51.

At a step 67 (Cycle End?), the function of cycle component 553 verifies whether the number of iterations defined by the function of cycle component 553 has been reached. If it has (output Y of block 67), the next step is a step 68 (COMP). If it has not (output N of block 67), then the next step is step 66 again, and the signature function continues the iterations.

At step 68, the final code Rf of circuit 3 is obtained, and it may be compared with a code obtained in parallel by the circuit by which circuit 3 desires to authenticate. If both codes are identical, then the authentication has succeeded, otherwise it has failed. As an example, the ID mode component 555 may obtain the final code Rf and compare the final code Rf with a code provided by an external device coupled to the device 55. If the final code Rf is a match with the code provided by the external device, the ID mode component 555 verifies the external device as being authentic and may authorize the device 55 to operate with the external device.

According to an alternative embodiment, step 68 may be a step forming a link towards other calculations taking the final code Rf as an input.

Various embodiments and variations have been described. It will be understood by those skilled in the art that certain features of these various embodiments and variations may be combined, and other variations will occur to those skilled in the art.

The described embodiments are simplified embodiments to disclose the principles of the performed authentication. The calculations and exchanges may be accompanied by any protection measure usual per se, for example, a symmetrical or asymmetrical ciphering of transmissions between the circuits to be authenticated.

Further, the one-way function of circuit 5 may be used in the same way as a one-way function, that is, for a circuit authentication method, for a data cipher method, or for a data hash method.

Figure 5A:
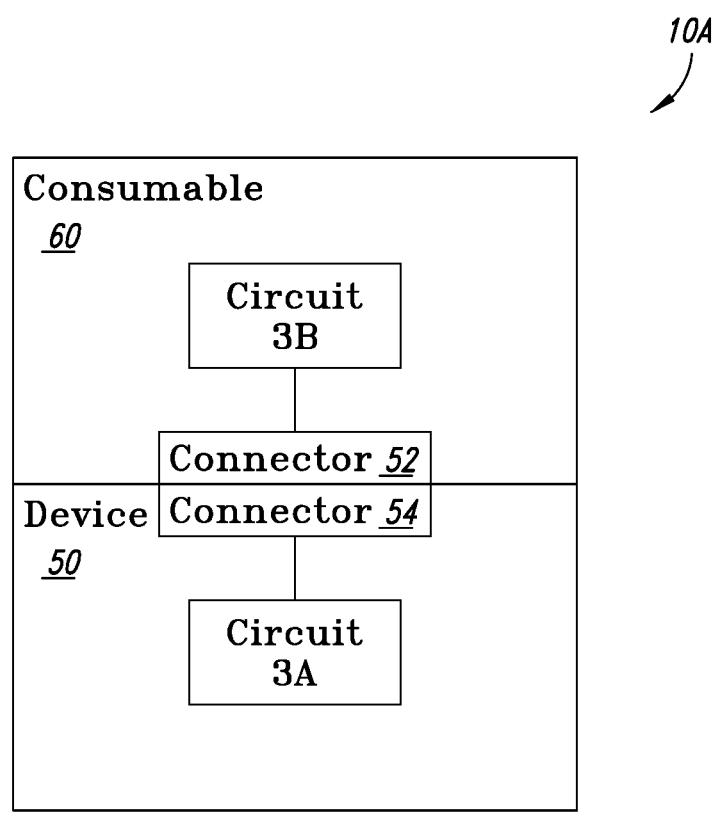
FIG. 5A shows a schematic diagram of a system that includes a device coupled to a consumable.

FIG. 5A shows a schematic diagram of a system 10A including a device 50 and a consumable 60 according to one or more embodiments herein. As a non-limiting example, the device 50 may be a printer and the consumable 60 may be a printer cartridge. The device 50 has a circuit 3A and the consumable 60 has a circuit 3B, the circuits 3A and the circuit 3B each having the structure and being configured to operate as described with respect to the circuit 3 herein. In the system 10a, the consumable 60 includes a connector 52 connected to a corresponding connector 54 of the device 50. The connectors 52 and 54 are coupled together providing an electrical connection between the circuits 3A and 3B via the I/O interfaces 37 thereof.

The device 50 and the consumable 60 each perform the authentication method described with respect to FIG. 4 and elsewhere herein. The circuit 3A of the device 50 may transmit a signal requesting the circuit 3B of the consumable 60 to provide electronic data for verifying the authenticity of the consumable 60. Each of the circuits 3A and 3B generates a final code Rf. In an initial iteration, the processor 31 of one of the circuits 3A and 3B may transmit, to the other one of the circuits 3A and 3B, information indicating an initial state or input for the circuits 53. The device 50 may obtain a consumable Rf generated by the circuit 3B and compare the final code Rf generated by the circuit 3B to the final code Rf generated by the circuit 3A. As a result of determining a match between the final signatures Rf generated by the circuits 3A and 3B, the circuit 3 may determine that the consumable 60 is authentic and authorize operation of the device 50 with the consumable 60. For example, the authorization circuit 4 may send a signal to another circuit of the device 50 authorizing operation of the device 50 with the consumable.

Figure 5B:
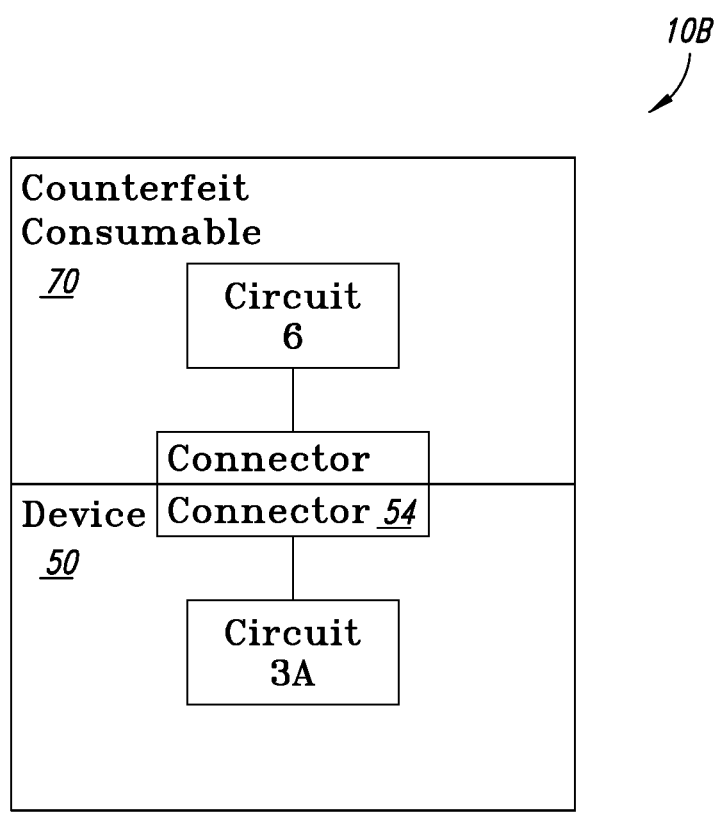
FIG. 5B shows a schematic diagram of a system that includes a device coupled to a counterfeit consumable.

FIG. 5B shows a schematic diagram of a system 10B including a device 50 and a counterfeit consumable 70. By contrast to the system 10A, the counterfeit consumable 70 includes a circuit 6 that is not substantially similar to the circuit 3 described herein. The circuit 3A of the device 50 may attempt to obtain electronic data (e.g., digital signature) from the counterfeit consumable 70 and compare the data obtained with a final code Rf generated by the circuit 3A. Due to the disparity between the circuit 3A and the circuit 6, the device 50 will determine that the digital object obtained is not a match for the final code Rf. As a result, the circuit 3 will not authorize the device 50 to operate using or may restrict operation of the device 50 with the counterfeit consumable 70.

Various alterations, modifications, and improvements intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if desired to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, using a first circuit of a device at a first time, a first fingerprint based on first states of a plurality of second circuits of the device;
generating, using the first circuit at a second time, a second fingerprint based on second states of the plurality of second circuits, the second states of the second circuits being based on an output of the first circuit;
performing a comparison between the second fingerprint and electronic data received from an external device; and
authorizing operation of the device with the external device based on a result of the comparison.

2. The method of claim 1, comprising:
providing the first fingerprint to the plurality of second circuits that determine the first states, one or more of the plurality of second circuits performing operations based on the first fingerprint to determine the second states.

3. The method of claim 1, wherein the second fingerprint is generated using a hash function, the method comprising:

generating the second states of the plurality of second circuits based on the second fingerprint.

4. The method of claim 3, wherein the plurality of second circuits generate the second states using a signature function.

5. The method of claim 1, wherein the first circuit performs a one-way function to generate the first fingerprint.

6. The method of claim 1, comprising:
modifying clock signals of the device based on the first fingerprint.

7. The method of claim 6, wherein operations performed by the plurality of second circuits are based on the modified clock signals.

8. The method of claim 1, comprising:
providing the first fingerprint to a third circuit that controls which of the plurality of second circuits performs a cryptographic operation for a given cycle.

9. A system, comprising:
a first device; and
a second device coupled to the first device, the second device including:
a plurality of logic circuits having outputs coupled to a plurality of nodes of the second device; and
processing circuitry coupled to the plurality of nodes and coupled to inputs of the plurality of logic circuits, wherein the processing circuitry, in operation:
generates a plurality of digital fingerprints over a time period, each digital fingerprint generated based on current states of the plurality of nodes, subsequent states of the plurality of nodes being generated based on each digital fingerprint;
receives electronic data from the first device;
compares the electronic data with a digital fingerprint of the plurality of fingerprints generated by the processing circuitry; and
authorizes operation of the second device with the first device based on the comparison.

10. The system of claim 9, wherein the second device is an electronic device and the first device is a consumable.

11. The system of claim 9, wherein the second device is a printer and the first device is an ink cartridge.

12. The system of claim 9, wherein the processing circuitry, in operation, generates a first digital fingerprint based on first states of the plurality of nodes and generates a second digital fingerprint based on second states of the plurality of nodes, the plurality of logic circuits generating the second states based on the first digital fingerprint.

13. The system of claim 9, the processing circuitry including:
one-way circuitry having an input coupled to the plurality of nodes and an output coupled to the plurality of logic circuits, wherein the one-way circuitry, in operation, performs a cryptographic hash function using states of the plurality of nodes as input.

14. A device, comprising:
a plurality of logic circuits having outputs coupled to a plurality of nodes;
processing circuitry coupled to the plurality of nodes and coupled to inputs of the plurality of logic circuits;
a connector, which, in operation, electronically couples the processing circuitry with circuitry of an external device, wherein the processing circuitry, in operation:
generates a plurality of digital fingerprints over a time period, each digital fingerprint generated based on current states of the plurality of nodes, subsequent states of the plurality of nodes being generated based on an output of the processing circuitry, the digital fingerprints being based on the output;
receives electronic data from circuitry of the external device;
compares the electronic data with a digital fingerprint of the plurality of fingerprints generated by the processing circuitry; and
authorizes operation of the device with the external device based on a match between the electronic data and the digital fingerprint.

15. The device of claim 14, wherein the device is a printer.

16. The device of claim 14, wherein the processing circuitry, in operation, sends a signal to the external device requesting the electronic data.

17. The device of claim 14, the processing circuitry including:
one-way circuitry having an input coupled to the plurality of nodes and an output coupled to the plurality of logic circuits, wherein the one-way circuitry, in operation, performs a cryptographic hash function using states of the plurality of nodes as input.

18. The device of claim 14, the processing circuitry including:
cycle circuitry, which, in operation, defines a number of cycles for generating the plurality of digital fingerprints.

19. The device of claim 14, wherein the processing circuitry, in operation, generates the second fingerprint using a hash function, and the plurality of logic circuits, in operation, generate the second states based on the second fingerprint.

20. The device of claim 19, wherein the plurality of logic circuits, in operation, generates the second states using a signature function.

21. The device of claim 14, the processing circuitry including:
cycle circuitry, which, in operation, modifies clock signals of the device based on the first fingerprint.

22. The device of claim 21, wherein the plurality of logic circuits, in operation, perform operations based on the modified clock signals.

23. The device of claim 14, the processing circuitry including:
cycle circuitry, which, in operation, selects which of the plurality of second circuits performs a cryptographic operation for a given cycle.

24. A device, comprising:
a plurality of logic circuits having outputs coupled to a plurality of nodes;
processing circuitry coupled to the plurality of nodes and coupled to inputs of the plurality of logic circuits; and
a connector, which, in operation, electronically couples the processing circuitry with circuitry of an electronic device, wherein the processing circuitry, in operation:
receives, from the electronic device via the connector, a request to provide electronic data for verifying authenticity of the device;
generates a plurality of digital fingerprints over a time period, each digital fingerprint generated based on current states of the plurality of nodes and each digital fingerprint influencing subsequent states of the plurality of nodes provided by the plurality of logic circuits; and
transmits a digital fingerprint to the electronic device to fulfill the request.

25. The device of claim 24, wherein the device is an ink cartridge and the electronic device is a printer device.

26. The device of claim 24, the processing circuitry including:
one-way circuitry having an input coupled to the plurality of nodes and an output coupled to the plurality of logic circuits, wherein the one-way circuitry, in operation, performs a cryptographic hash function using states of the plurality of nodes as input.

\* \* \* \* \*